US010469369B2

(12) United States Patent
Beeram et al.

(10) Patent No.: US 10,469,369 B2
(45) Date of Patent: *Nov. 5, 2019

(54) SIMPLE HIERARCHICAL LABEL-SWITCHED PATHS

(71) Applicant: Juniper Networks, Inc., Sunnyvale, CA (US)

(72) Inventors: Vishnu Pavan Beeram, Ashburn, VA (US); Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,060

(22) Filed: Nov. 30, 2017

(65) Prior Publication Data

US 2018/0083870 A1 Mar. 22, 2018

Related U.S. Application Data

(63) Continuation of application No. 14/981,192, filed on Dec. 28, 2015, now Pat. No. 9,838,307.

(51) Int. Cl.
*H04L 12/723* (2013.01)
*H04L 12/815* (2013.01)
(Continued)

(52) U.S. Cl.
CPC ............ *H04L 45/50* (2013.01); *H04L 45/42* (2013.01); *H04L 45/46* (2013.01); *H04L 47/22* (2013.01); *H04L 49/25* (2013.01)

(58) Field of Classification Search
None
See application file for complete search history.

(56) References Cited

U.S. PATENT DOCUMENTS 7,680,923 B1 * 3/2010 Allan .................. H04L 41/0866
   709/201
7,787,380 B1    8/2010 Aggarwal
(Continued)

FOREIGN PATENT DOCUMENTS

| CN | 101588288 A | 11/2009 |
| CN | 101861714 A | 10/2010 |
| CN | 103416029 A | 11/2013 |

OTHER PUBLICATIONS

Hummel et al., "Hierarchical LSP", MPLS Working Group, Internet Draft, Oct. 2002, 26 pages.
(Continued)

*Primary Examiner* — Anh Vu H Ly
(74) *Attorney, Agent, or Firm* — Harrity & Harrity, LLP

(57) ABSTRACT

A device may identify a portion of a label-switched path (LSP) on which a simple hierarchical LSP (sH-LSP) is to be used for transferring traffic via a network. The device may determine attribute information associated with the sH-LSP. The attribute information may include information associated with one or more characteristics of the sH-LSP. The device may provide an indication associated with identifying an available sH-LSP or creating a sH-LSP. The indication may include the attribute information associated with the sH-LSP, and may be being provided to cause the sH-LSP to be created on the portion of the LSP or an available sH-LSP, associated with the portion of the LSP, to be identified. The device may receive, based on providing the indication, an identifier associated with the sH-LSP. The device may cause the LSP to be set up based on the identifier associated with the sH-LSP.

20 Claims, 13 Drawing Sheets

(51) Int. Cl.
   *H04L 12/947* (2013.01)
   *H04L 12/715* (2013.01)
   *H04L 12/717* (2013.01)

(56) References Cited

U.S. PATENT DOCUMENTS

| | | | |
|---|---|---|---|
| 7,804,767 B1* | 9/2010 | Owens | H04L 45/00 370/217 |
| 8,363,571 B2 | 1/2013 | Vasseur et al. | |
| 8,441,937 B2 | 5/2013 | Gero | |
| 8,953,500 B1* | 2/2015 | Shen | H04L 45/16 370/238 |
| 9,794,165 B1* | 10/2017 | Wood | H04L 45/507 370/252 |
| 9,838,307 B2 | 12/2017 | Beeram et al. | |
| 10,110,479 B1* | 10/2018 | Ramachandran | H04L 45/50 370/389 |
| 2003/0081589 A1 | 5/2003 | Marian | |
| 2003/0193901 A1* | 10/2003 | Ishibashi | H04L 45/02 370/252 |
| 2006/0120288 A1 | 6/2006 | Vasseur | |
| 2008/0069007 A1 | 3/2008 | Vasseur | |
| 2009/0067330 A1* | 3/2009 | Shand | H04L 45/04 370/235 |
| 2012/0042077 A1 | 2/2012 | Ceccarelli | |
| 2012/0076046 A1* | 3/2012 | Lin | H04L 12/40013 370/254 |
| 2013/0227146 A1* | 8/2013 | Wang | H04L 47/724 709/226 |
| 2015/0146536 A1* | 5/2015 | Minei | H04L 45/507 370/236 |
| 2015/0163125 A1* | 6/2015 | Caviglia | H04L 45/44 370/254 |
| 2015/0195178 A1 | 7/2015 | Bhattacharya | |
| 2017/0070426 A1* | 3/2017 | Chen | H04L 45/50 370/252 |
| 2017/0317780 A1* | 11/2017 | Wood | H04J 14/0286 370/252 |

OTHER PUBLICATIONS

Zhang et al., "GMPLS-based Hierarchy LSP Creation in Multi-Region and Multi-Layer Networks", Network Working Group, Internet Draft, Category: Standards Track, Jul. 11, 2013, 33 pages.
Kompella et al., "Label Switched Paths (LSP) Hierarchy with Generalized Multi-Protocol Label Switching (GMPLS) Traffic Engineering (TE)", Network Working Group, Request for Comments: 4206, Category: Standards Track, Oct. 2005, 28 pages.
Shiomoto et al., "Procedures for Dynamically Signaled Hierarchical Label Switched Paths", Internet Engineering Task Force (IETF), Request for Comments: 6107, Updates: 3477, 4206, Category: Standards Track, ISSN: 2070-1721, Feb. 2011, 60 pages.
Bespalov, "WANDL and Northstar Solutions for operators," www.slideshare.net/TerrniLab/wandlnorthstar-42813766, Dec. 17, 2014, 52 pages.
Kompella, "SDN: Roadmap to Operating SON-based Networks," https://www.nitrd.gov/nitrdgroups/images/3/35/SDN_-_Kireeti_Kompella.pdf, Jul. 15, 2015, 27 pages.
Extended European Search Report corresponding to EP Application No. 16155712.9, dated Jun. 6, 2016, 10 pages.
Extended European Search Report for Application No. EP18191484.7, dated Jan. 16, 2019, 13 pages.

* cited by examiner

SIMPLE HIERARCHICAL LABEL-SWITCHED PATHS

RELATED APPLICATION

This application is a continuation of U.S. patent application Ser. No. 14/981,192, filed Dec. 28, 2015 (now U.S. Pat. No. 9,838,307), which is incorporated herein by reference.

BACKGROUND

A label-switched path (LSP) is a network path through a label switching network, such as a Multi-Protocol Label Switching (MPLS) network. The LSP may begin at an ingress device located at an edge of the label switching network (e.g., a first label edge router (LER)), and may include one or more intermediate network devices (e.g., one or more label switched routers (LSRs)) before ending at an egress device at the edge of the label switching network (e.g., a second LER).

SUMMARY

According to some possible implementations, a method may include: identifying, by a device, a portion of a label-switched path (LSP) on which a simple hierarchical LSP (sH-LSP) is to be used for transferring traffic via a network; determining, by the device, attribute information associated with the sH-LSP, where the attribute information may include information associated with one or more characteristics of the sH-LSP; providing, by the device, an indication associated with identifying an available sH-LSP or creating a sH-LSP, where the indication may include the attribute information associated with the sH-LSP, and where the indication may be provided to cause the sH-LSP to be created on the portion of the LSP or an available sH-LSP, associated with the portion of the LSP, to be identified; receiving, by the device and based on providing the indication, an identifier associated with the sH-LSP; and causing, by the device, the LSP to be set up based on the identifier associated with the sH-LSP.

According to some possible implementations, a device may include one or more processors to: identify a portion of a label-switched path (LSP) for which a simple hierarchical LSP (sH-LSP) is to be used to transfer traffic across a network; determine attribute information associated with the sH-LSP, where the attribute information may identify one or more characteristics of the sH-LSP; and provide information associated with setting up the LSP, where the information may include information indicating that the sH-LSP is to be used on the portion of the LSP and the attribute information associated with the sH-LSP, and where the information may be provided to cause the sH-LSP to be automatically created on the portion of the LSP or to cause an available sH-LSP, existing on the portion of the LSP, to be identified.

According to some possible implementations, a method may include: receiving, by a device, an indication associated with a simple hierarchical label switched path (sH-LSP), where the sH-LSP may be associated with a portion of a LSP, and where the indication may include attribute information associated with the sH-LSP; determining, by the device, whether an existing sH-LSP, associated with the portion of the LSP, is available to be used on the portion of the LSP; selectively: creating the sH-LSP based on determining that the existing sH-LSP is not available to be used on the portion of the LSP, where the sH-LSP may be created based on the attribute information, or identifying that the existing sH-LSP is to be used on the portion of the LSP based on determining that the existing sH-LSP is available; and providing, by the device, an identifier associated with the created sH-LSP or an identifier associated with the existing sH-LSP, where the identifier may be provided to permit the LSP to be set up based on the identifier.

DETAILED DESCRIPTION

Figure 1A:
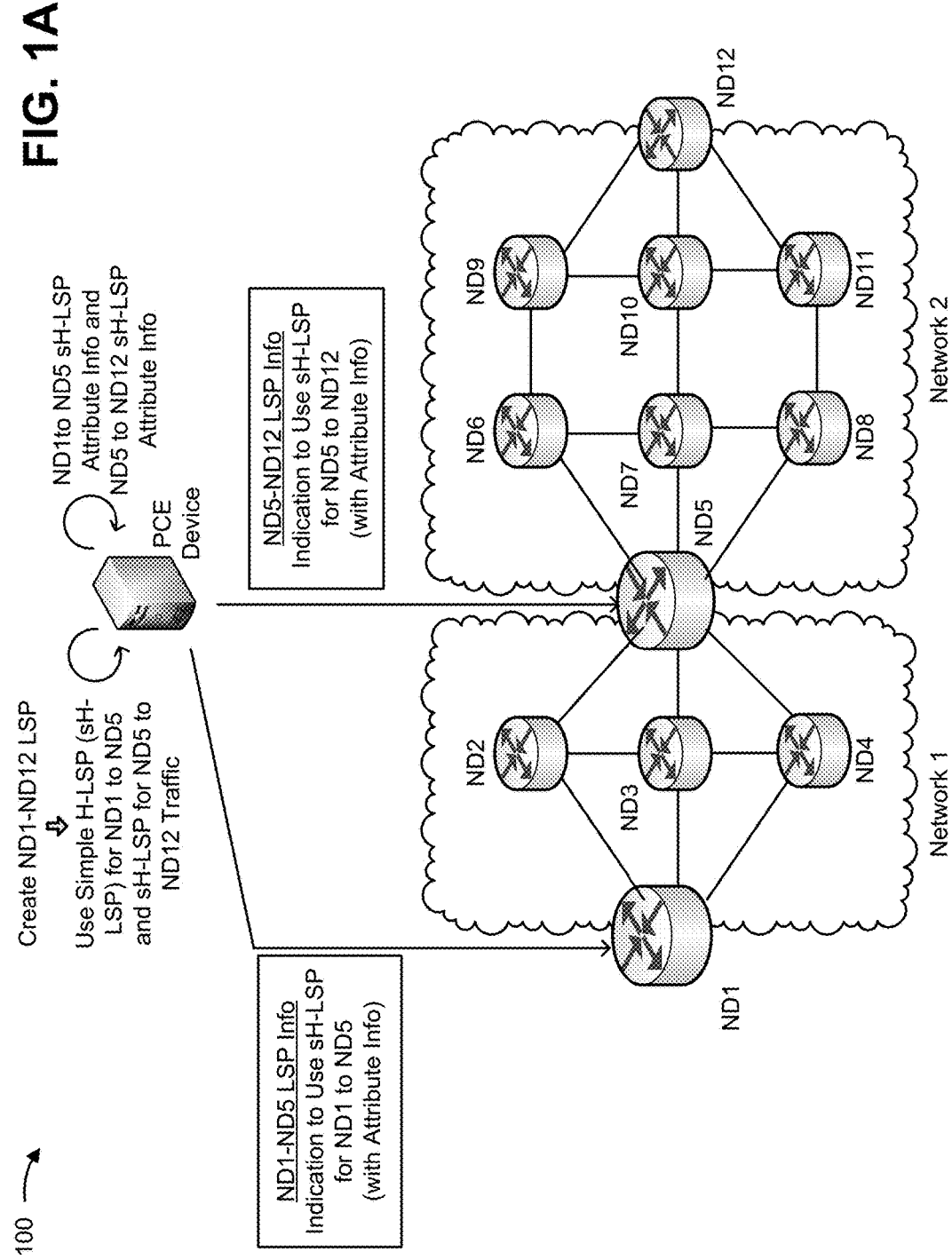
FIGS. 1A-1H are diagrams of an overview of an example implementation described herein.
Figure 1B:
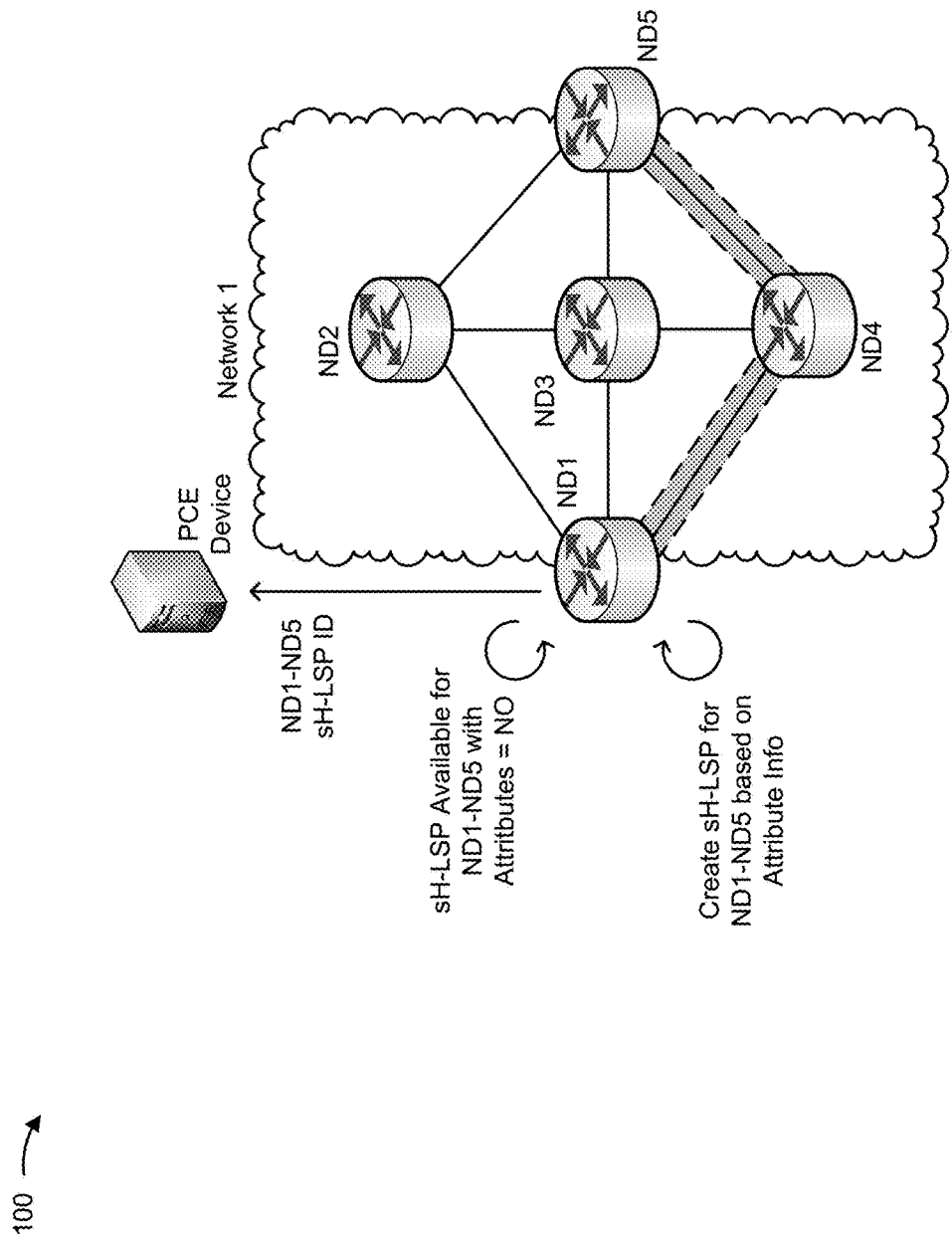

The following detailed description of example implementations refers to the accompanying drawings. The same reference numbers in different drawings may identify the same or similar elements.

Aggregating LSPs to create a hierarchy of LSPs may allow for improved scalability of a label switching network (e.g., an MPLS network, a Generalized MPLS (GMPLS) network, etc.). For example, creating a hierarchy of LSPs (e.g., such that an LSP includes a set of a label-switched concatenation of physical interfaces and/or a set of hierarchical LSPs (H-LSPs)), may allow for improved scalability of an MPLS network. One manner in which such a hierarchy may be created is by configuring a router (e.g., a LER, a LSR, etc.) to form an H-LSP when creating a LSP by, for example, advertising the LSP as a Traffic Engineering (TE) link (e.g., on a same Interior Gateway Protocol (IGP) instance as an KW instance that was used to create the LSP). The router may then allow other routers to use the H-LSP for path computation and/or may nest other H-LSPs created by the other routers into the H-LSP (e.g., by using the label stack construct). As such, the H-LSP may include a set of hierarchically next-lower H-LSPs where, at a lowest layer, a hierarchy may include a set of label-switched sequences of physical interfaces (e.g., as with traditional LSPs). Similarly, the H-LSP may be included in a hierarchically next-higher H-LSP.

However, distributed management (e.g., deployment, configuration, maintenance, creation, etc.) of H-LSPs within the network may require a significant amount of overhead within the network and/or by a user. For example, management of H-LSPs within the network may need to be configured on a per router basis. As such, due to the distributed nature of managing H-LSPs, it may not be possible for a centralized entity (e.g., a Path Computation Element (PCE)) to instruct a router to create an H-LSP, even though such instruction may simplify management of the H-LSP and/or an overlay LSP that includes the H-LSP.

Implementations described herein may provide for a simple H-LSP (sH-LSP) for which management is simplified such that an amount of resources and/or an amount of user configuration is reduced (e.g., as compared to a traditional H-LSP). In some implementations, a sH-LSP differs from a traditional H-LSP in that a centralized entity, such as a PCE, may cause the sH-LSP to be created (while is not possible for a centralized entity to cause a traditional H-LSP to be created). For example, the PCE may indicate that the sH-LSP is to be used on a particular portion of a LSP associated with a network and, thus, may instruct another device to create the sH-LSP or identify of an existing sH-LSP for use in the LSP. The sH-LSP also differs from the traditional H-LSP in that the sH-LSP may be kept private (i.e., not advertised) such that only the PCE and a head end node, associated with the sH-LSP, know of the existence of the sH-LSP (while existence of the traditional H-LSP may be advertised to other devices).

In some implementations, the PCE may cause the LSP to be set up after the PCE receives an identifier associated with the sH-LSP. In some implementations, after the sH-LSP is created, the sH-LSP identifier (e.g., a TE link identifier) may be kept private (i.e., may not advertised) such that only the PCE and/or a head end node of the sH-LSP store or have access to the sH-LSP identifier. This may prevent overuse and/or congestion of the sH-LSP since the PCE may monitor and/or manage use of the sH-LSP for various traffic flows. In some implementations, the PCE may cause the LSP to be set up based on providing attribute information associated with the sH-LSP (e.g., such that the sH-LSP is created or identified during setup of the LSP).

FIGS. 1A-1H are diagrams of an overview of example implementations 100 and 150 described herein. For the purposes of example implementations 100 and 150, assume that a PCE has received an indication to initiate setup of a LSP for transferring traffic between a first edge device of a first network (e.g., ND1 in network 1) and a second edge device of a second network (e.g., ND12 in network 2). Further, assume that the PCE is configured to identify one or more portions of the LSP on which sH-LSPs are to be used when setting up the LSP.

A sH-LSP may include an H-LSP that is automatically (e.g., without user intervention) and/or dynamically created based on an instruction and/or attribute information provided by the PCE (and/or an edge device with intelligence similar to the PCE). As such, some implementations, the sH-LSP may be an H-LSP for which creation, configuration, management, maintenance, or the like, requires fewer network resources, processing resources, memory resources, and/or less user configuration than a traditional H-LSP.

As shown in FIG. 1A, for example implementation 100, the PCE may receive the indication to initiate the setup of the LSP and may determine (e.g., based on a configuration of the PCE, based on performing traffic engineering for network 1, based on performing traffic engineering for network 2, etc.) that a first sH-LSP is to be used on a first portion of the LSP (e.g., a sH-LSP from ND1 to ND5 that traverses network 1) and that a second sH-LSP is to be used on a second portion of the LSP (e.g., a sH-LSP from ND5 to ND12 that traverses network 2). In some implementations, the PCE may determine whether sH-LSPs are to be used on each portion of the LSP.

As further shown, after identifying that the first sH-LSP and the second sH-LSP are to be used, the PCE may determine attribute information associated with the first sH-LSP and the second sH-LSP. The attribute information may include information that describes one or more configurations of the sH-LSP such that the sH-LSP may be capable of supporting the traffic associated with the LSP. As shown, the PCE may determine first attribute information associated with the first sH-LSP (e.g., attribute information associated with the sH-LSP from ND1 to ND5) and second attribute information associated with the second sH-LSP (e.g., attribute information associated with the sH-LSP from ND5 to ND12).

As further shown, the PCE may then provide, to ND1 (i.e., a first device in the first sH-LSP) an indication associated with the first sH-LSP. As shown, the indication may include an indication that the first sH-LSP is to be used for the first portion of the LSP (e.g., from ND1 to ND5, across network 1) and the first attribute information associated with the first sH-LSP. As further shown, the PCE may also provide, to ND5 (i.e., a first device in the second sH-LSP), an indication associated with the second sH-LSP. As shown, the indication may include an indication that the second sH-LSP is to be used for the second portion of the LSP (e.g., from ND5 to ND12, across network 2) and the second attribute information associated with the second sH-LSP.

Figure 1C:
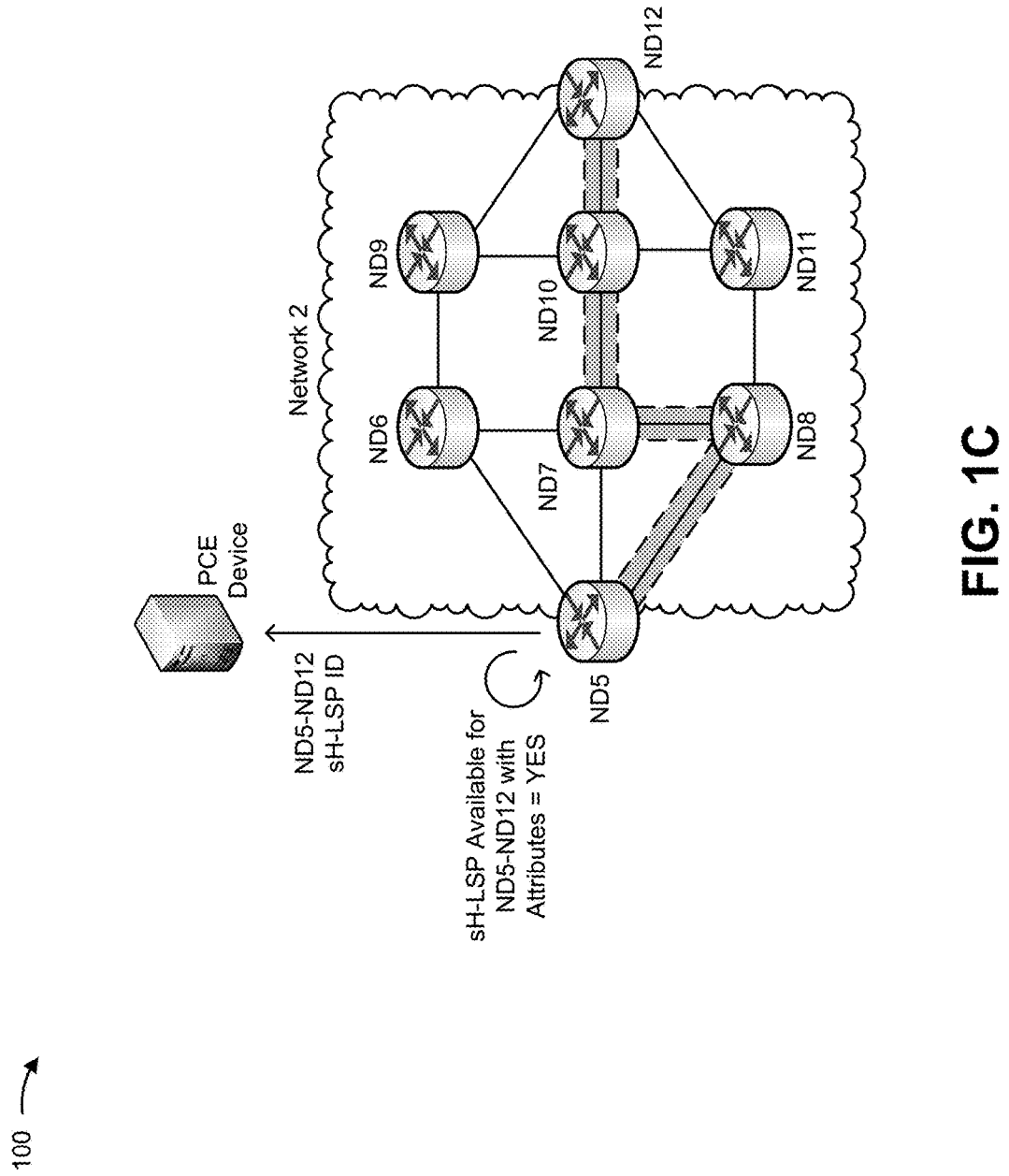
Figure 1D:
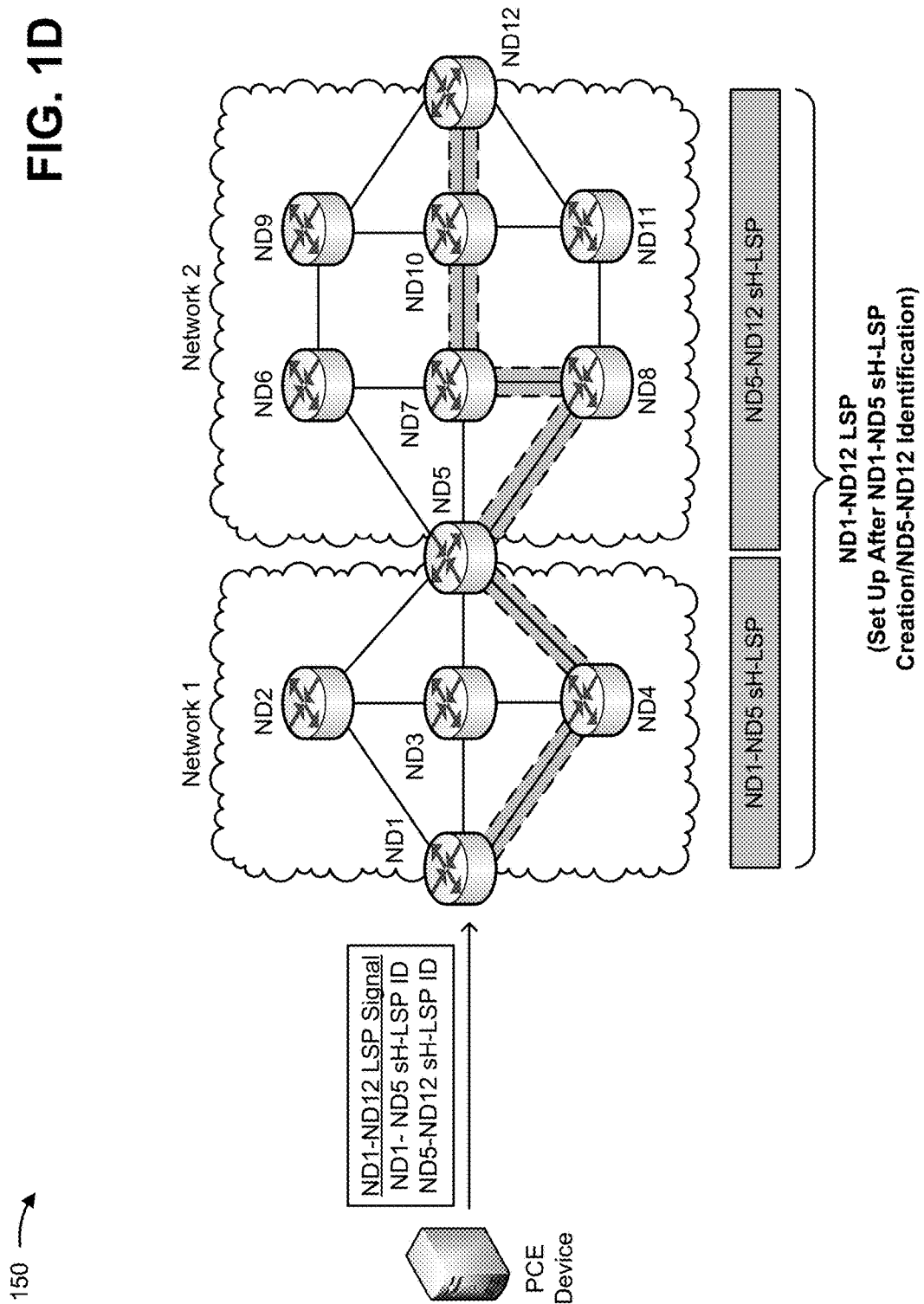
Figure 1E:
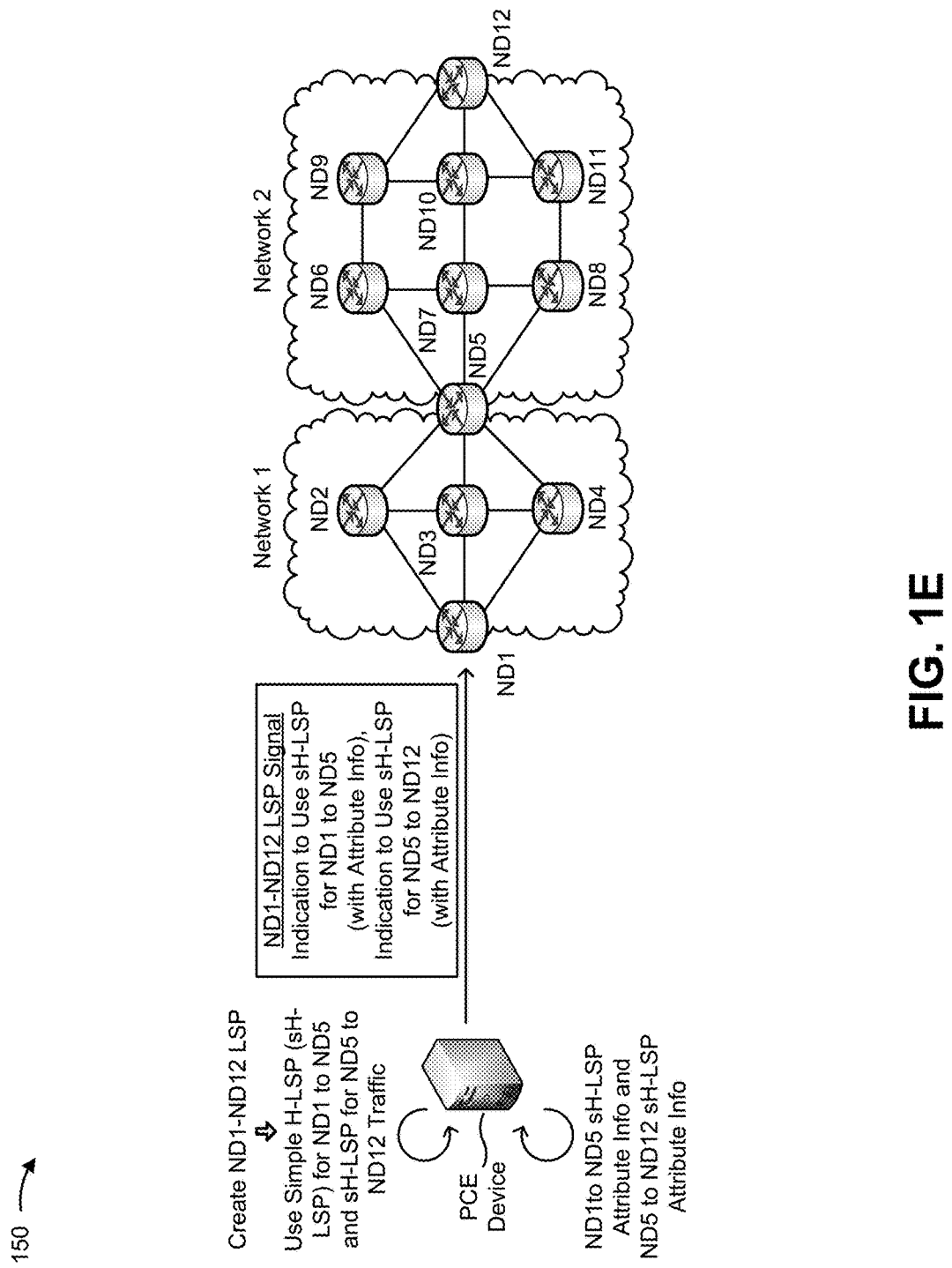
Figure 1F:
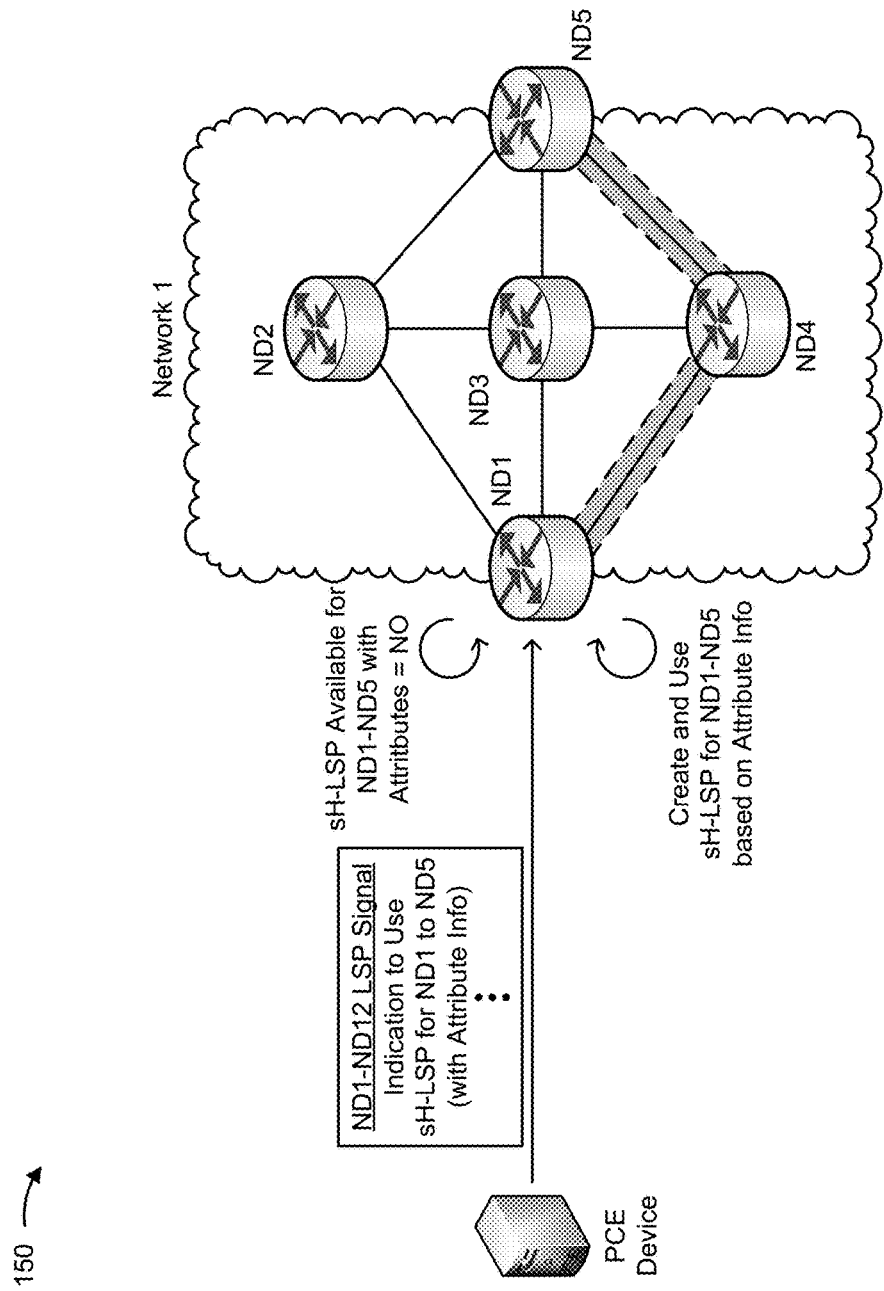

As shown in FIG. 1F, ND1 may receive the indication associated with the first sH-LSP, and may determine whether an existing sH-LSP is available such that ND1 does not need to create the first sH-LSP. For example, ND1 may determine that an existing sH-LSP (e.g., a sH-LSP already supported by ND1) is available when an end of the existing sH-LSP matches an end of the first portion of the LSP (e.g., whether the ND1 already supports a sH-LSP that ends at ND5), when configurations of the existing sH-LSP match the attribute information associated with the first sH-LSP, and/or when the existing sH-LSP has resources available to support the traffic associated with the LSP.

As shown, assume that ND1 determines that there is no existing sH-LSP available and, therefore, that ND1 should create the first sH-LSP. As shown, ND1 may create the first sH-LSP based on the first attribute information (e.g., a sH-LSP including ND1, ND4, and ND5). As further shown, ND1 may provide, to the PCE, an identifier associated with the first sH-LSP. In some implementations, the identifier associated with the first sH-LSP may be kept private such that only the PCE and ND1 are the only devices to which the first sH-LSP identifier are known or accessible. This may prevent overuse and/or congestion of the first sH-LSP since other devices may not be capable of using the first sH-LSP for other traffic flows.

As shown in FIG. 1C, ND5 may receive the indication associated with the second sH-LSP, and may determine (e.g., in a manner similar to that described above) whether an existing sH-LSP is available such that ND5 does not need to create the second sH-LSP. As shown, assume that ND5 determines that there is an existing sH-LSP available (e.g., a sH-LSP including ND5, ND8, ND7, ND10, and ND12) and, therefore, that ND1 should not create the second sH-LSP. As shown, ND5 may provide, to the PCE, an identifier associated with the second sH-LSP.

As shown in FIG. 1D, after the PCE receives the identifiers associated with the first sH-LSP and the second sH-LSP, the PCE may provide an indication associated with setting up the LSP (e.g., ND1-ND12 LSP Signal). As shown, the indication may include the identifiers associated with the first sH-LSP and the second sH-LSP. As further shown, the LSP may be set up using the identifiers, and the LSP may be used to transfer traffic across network 1 and network 2.

In this way, one or more sH-LSPs may be identified and/or created, and an LSP may be set up using one or more identifiers corresponding to the one or more sH-LSPs. Notably, in example implementation 100, the first sH-LSP and the second sH-LSP may be created before the LSP is set up (e.g., based on the identifiers). Example implementation 150 shows another manner in which the LSP may be set up using sH-LSPs.

As shown in FIG. 1E, for example implementation 150, the PCE may receive the indication to initiate the setup of the LSP and may determine that the first sH-LSP is to be used on the first portion of the LSP and that the second sH-LSP is to be used on the second portion of the LSP. As further shown, after identifying that the first sH-LSP and the second sH-LSP are to be used, the PCE may determine attribute information associated with the first sH-LSP and the second sH-LSP.

As further shown, the PCE may then provide, to ND1 (i.e., a first device in the LSP), an indication associated with setting up the LSP (e.g., the ND1-ND12 LSP Signal). As shown, the indication, associated with setting up the LSP, may include the first attribute information associated with the first sH-LSP, and the second attribute information associated with the second sH-LSP (e.g., rather than sH-LSP identifiers as described with regard to example implementation 100).

As shown in FIG. 1F, ND1 may receive the indication associated with setting up the LSP, and may determine whether an existing sH-LSP is available such that ND1 does not need to create the first sH-LSP. As shown, assume that ND1 determines that there is no existing sH-LSP available and, therefore, that ND1 should create the first sH-LSP. As shown, ND1 may create the first sH-LSP based on the first attribute, and may set up a portion of the LSP associated with the first sH-LSP (e.g., such that a first portion of the LSP is set up).

Figure 1G:
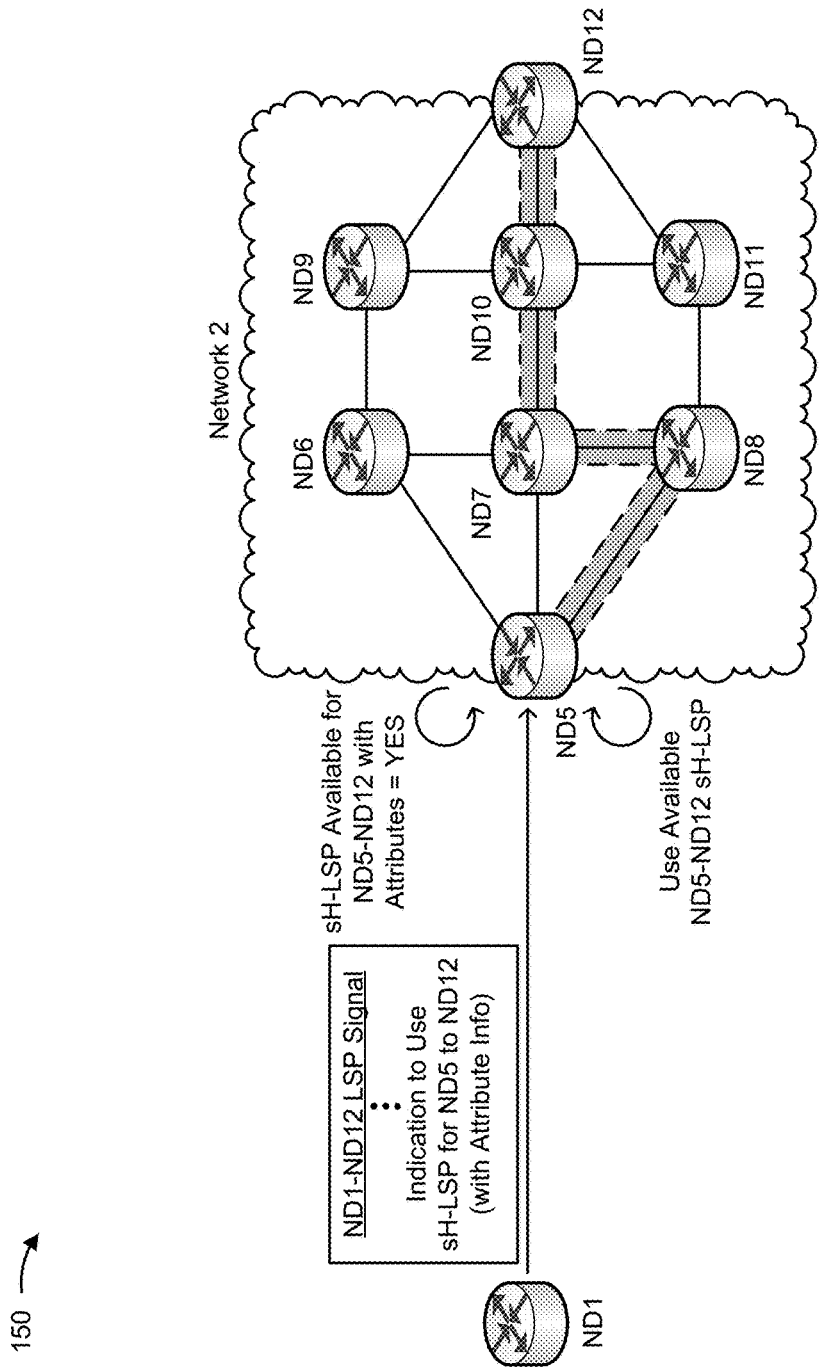

As shown in FIG. 1G, ND1 may then provide the indication associated with setting up the LSP to a next edge device associated with the LSP (e.g., ND5 at the end of the first sH-LSP and the start of the second sH-LSP). As shown, ND5 may receive the indication associated with setting up the LSP, and may determine whether an existing sH-LSP is available such that ND5 does not need to create the second sH-LSP. As shown, assume that ND5 determines that there is an existing sH-LSP available and, therefore, that ND5 should not create the second sH-LSP. As shown, ND5 may set up a portion of the LSP associated with the second sH-LSP (e.g., such that the first portion of the LSP and the second portion of the LSP are set up).

Figure 1H:
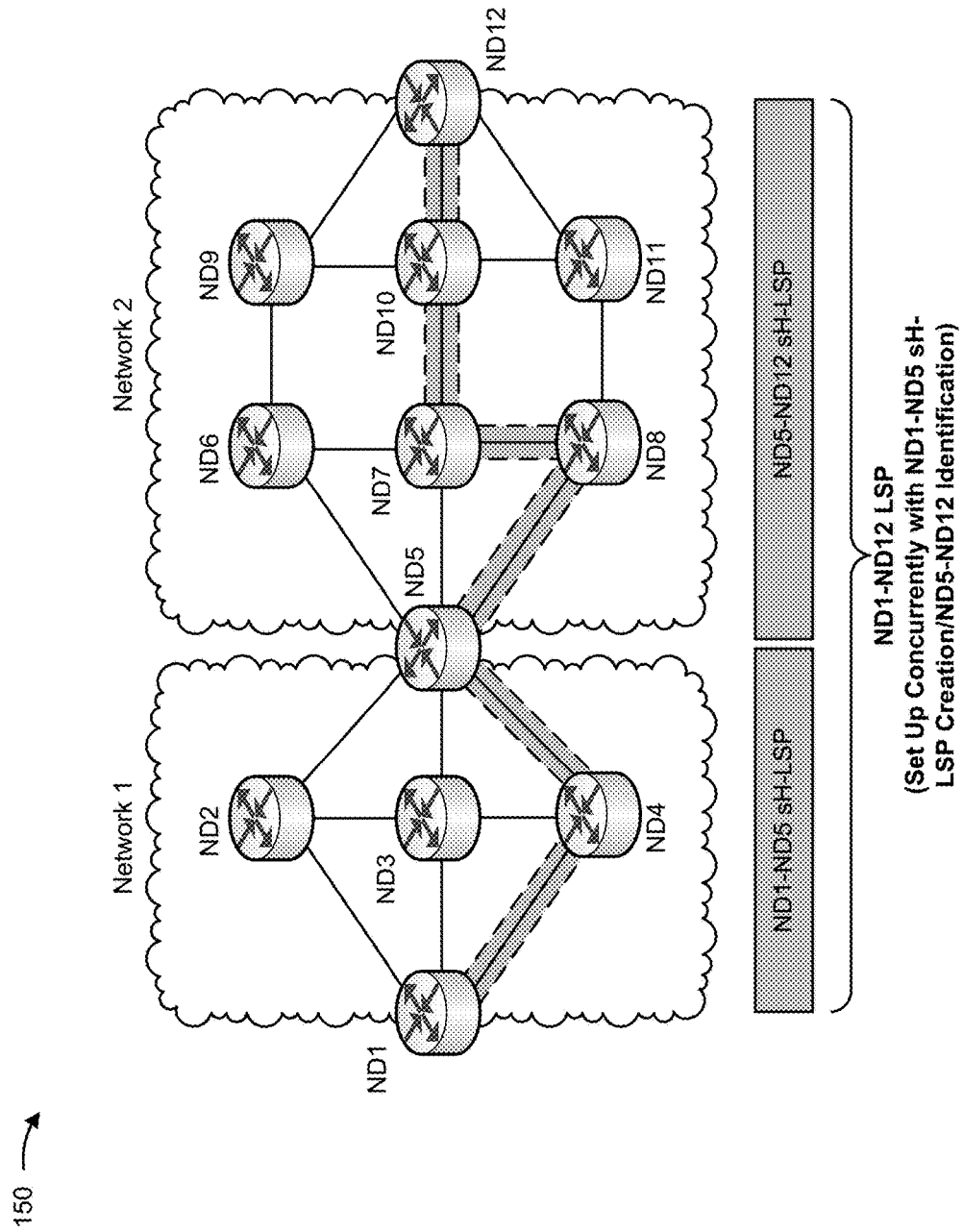

As shown in FIG. 1H, after ND5 sets up the second portion of the LSP (e.g., including the second sH-LSP), the set up of the LSP may be complete, and the LSP (e.g., the LSP from ND1 to ND12) may be used to transfer traffic across network 1 and network 2.

In this way, an LSP may be set up concurrently with one or more sH-LSPs being identified and/or created based on attribute associated with the one or more sH-LSPs. Notably, in example implementation 150, the first sH-LSP and the second sH-LSP may be created during setup of the LSP (e.g., based on the attribute information).

Figure 2:
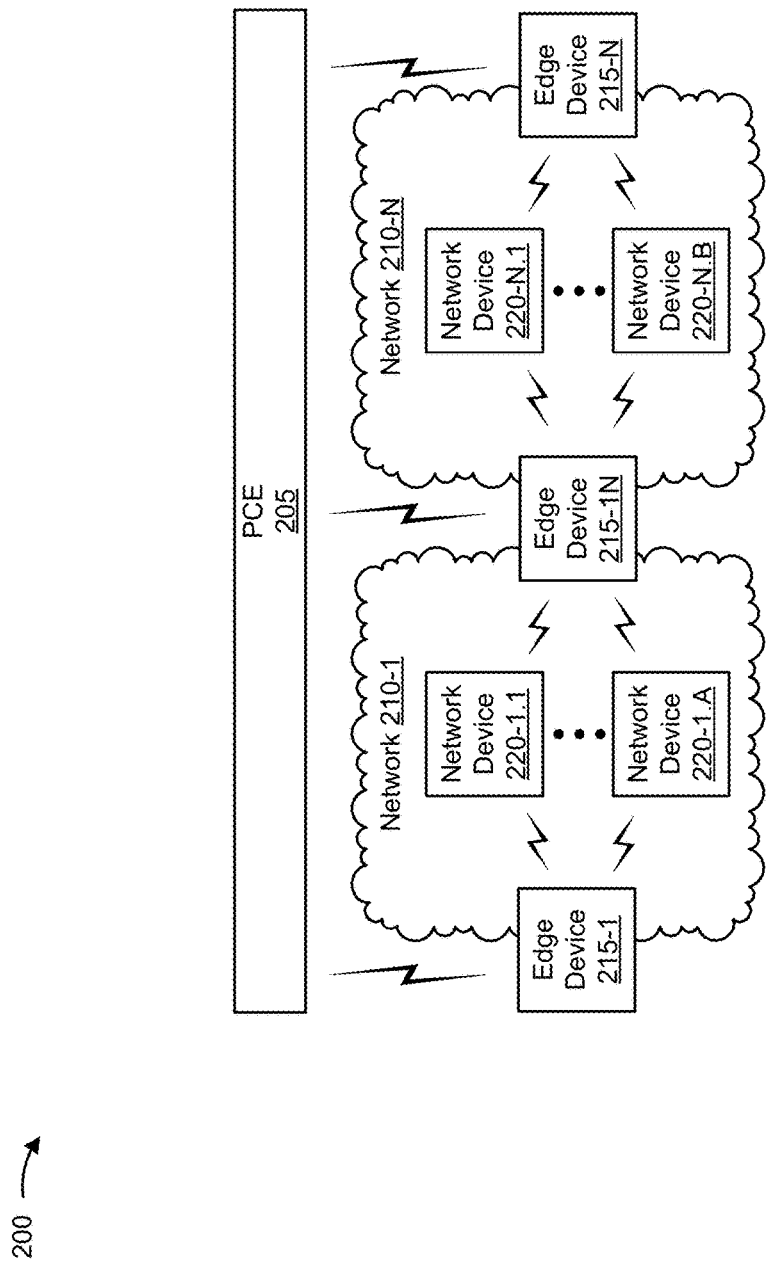
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a PCE 205 and two or more networks 210-1 through 210-N (N>1) (hereinafter referred to collectively as networks 210, and individually as network 210). As shown, each network 210 may include a group of edge devices 215 (e.g., edge device 215-1 at an edge of network 210-1, edge device 215-1N at edges of network 210-1 and network 210-N, and edge device 215-N at an edge of network 210-N), and a group of network devices 220 (e.g., network device 220-1.1 through network device 220-1.A (A>1) included in network 210-1, and network device 220-N.1 through network device 220-N.B (B>1) included in network 210-N). Devices of environment 200 may interconnect via wired connections, wireless connections, or a combination of wired and wireless connections.

PCE 205 may include a device capable of identifying a portion of a LSP on which a sH-LSP is to be used to transfer traffic, determining attribute information associated with the sH-LSP, and causing the LSP to be set up such that the LSP includes the sH-LSP. For example, PCE 205 may include a server, a group of servers, a gateway, a router, a switch, a server, a modem, a network interface card (NIC), a hub, a bridge, an optical add-drop multiplexer (OADM), or the like. In some implementations, PCE 205 may be capable of performing traffic engineering associated with one or more networks 210 by, for example, analyzing traffic data associated with the one or more networks 210.

Network 210 may include one or more wired and/or wireless label switching networks that support use of LSPs and sH-LSPs to transfer traffic. For example, network 210 may include a MPLS network, GMPLS network, or the like. In some implementations, network 210 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, network 210 may include a group of edge devices 215 and a group of network devices 220.

Edge device 215 may include a device, positioned at an edge of one or more networks 210, that is capable of creating, using, and/or maintaining a sH-LSP. For example, edge device 215 may include a server, a group of servers, a gateway, a router, a switch, a server, a modem, a NIC, a hub, a bridge, an optical add-drop multiplexer OADM, or the like. In some implementations, edge device 215 may be positioned at edges of one or more networks 210. In some implementations, edge device 215 may include a LER associated with an MPLS network.

Network device 220 may include a device, positioned at an interior of network 210, that is capable of transferring traffic via a sH-LSP. For example, network device 220 may include a server, a group of servers, a gateway, a router, a switch, a server, a modem, a NIC, a hub, a bridge, an optical add-drop multiplexer OADM, or the like. In some implementations, network device 220 may include a LSR associated with an MPLS network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
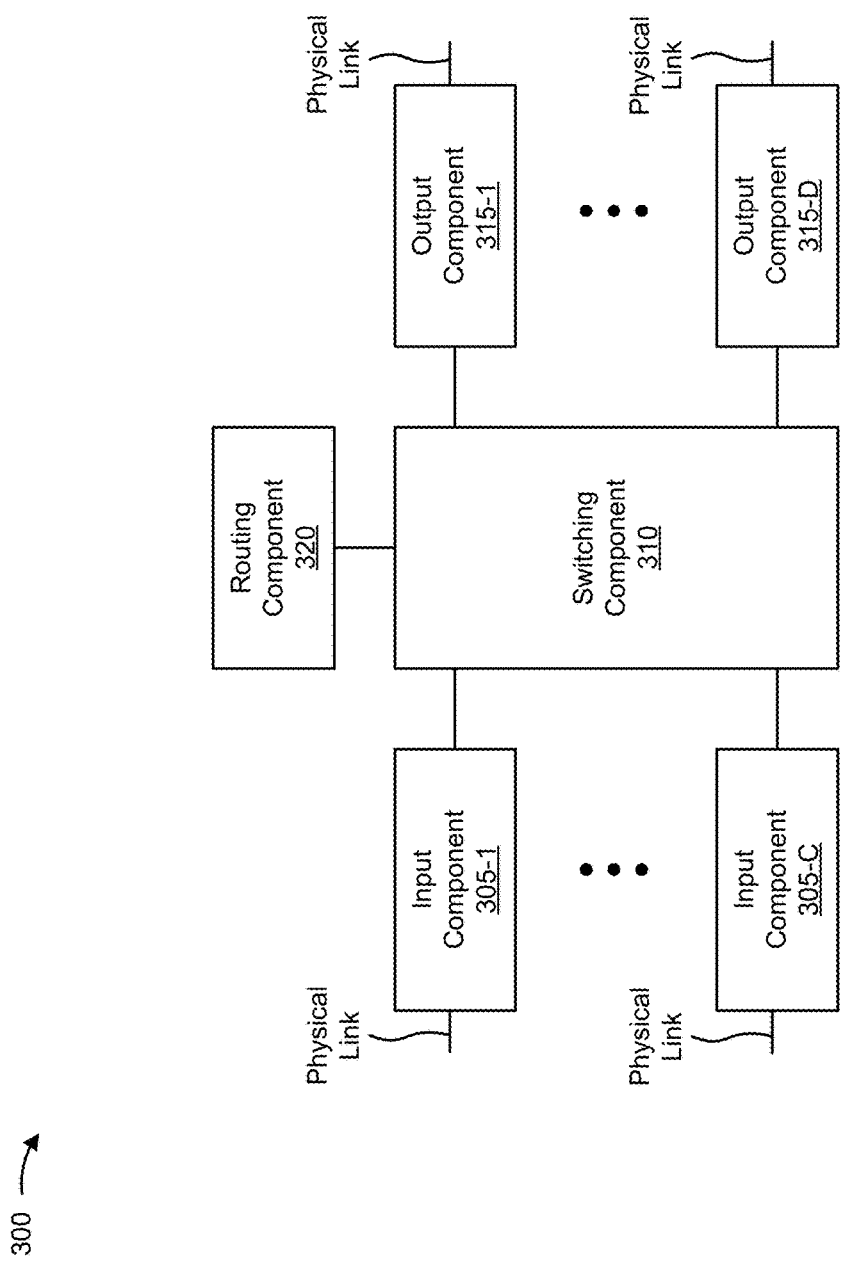
FIGS. 3A and 3B are diagrams of example components of one or more devices of FIG. 2.

FIG. 3A is a diagram of example components of a device 300. Device 300 may correspond to edge device 215 and/or network device 220. In some implementations, edge device 215 and/or network device 220 may include one or more devices 300 and/or one or more components of device 300. As shown in FIG. 3A, device 300 may include one or more input components 305-1 through 305-C (C≥1) (hereinafter referred to collectively as input components 305, and individually as input component 305), a switching component 310, one or more output components 315-1 through 315-D (D≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform functions described as being performed by another set of components of device 300.

Figure 3B:
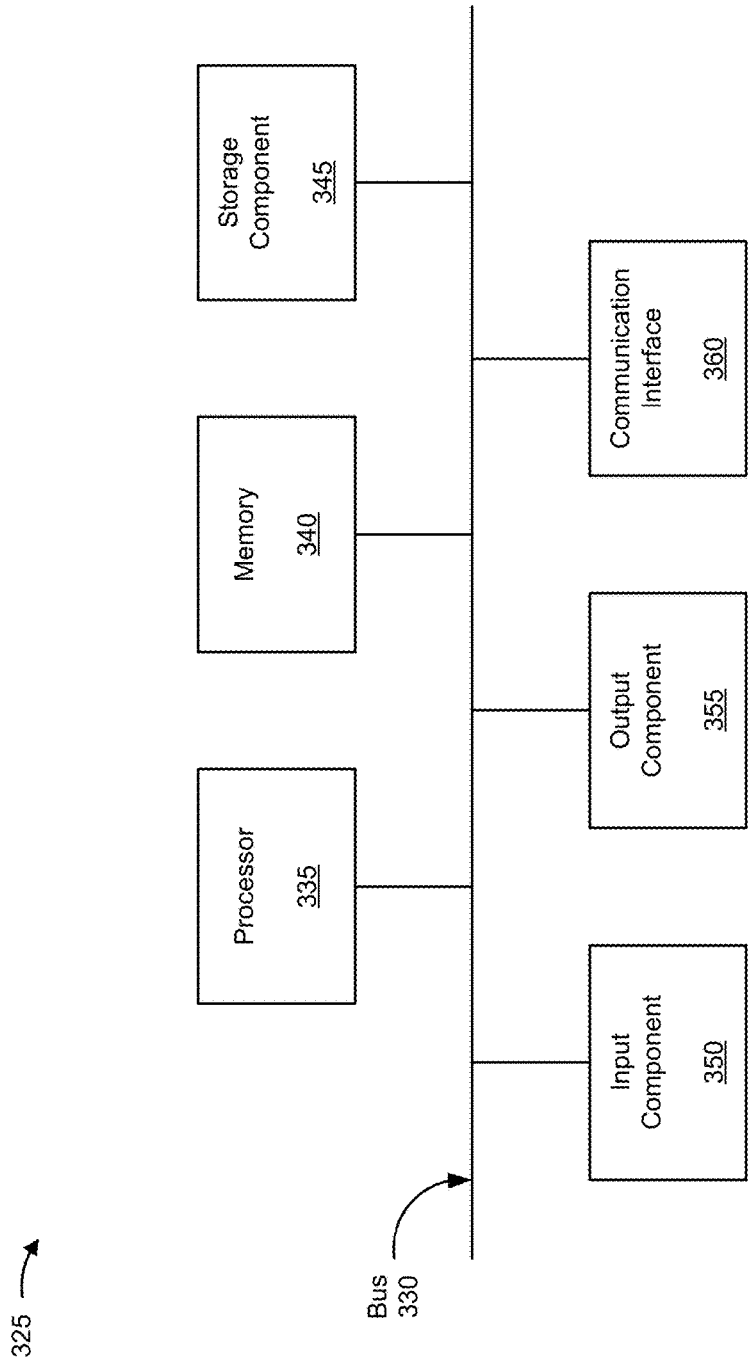

FIG. 3B is a diagram of example components of a device 325. Device 325 may correspond to PCE 205. In some implementations, PCE 205 may include one or more devices 325 and/or one or more components of device 325. As shown in FIG. 39, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a central processing unit (CPU), a graphics processing unit (GPU), an accelerated processing unit (APU), etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RE) interface, a universal serial bus (USB) interface, a Wi-Fi interface, a cellular network interface, or the like.

Device 325 may perform one or more processes described herein. Device 325 may perform these processes in response to processor 335 executing software instructions stored by a non-transitory computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

Figure 4:
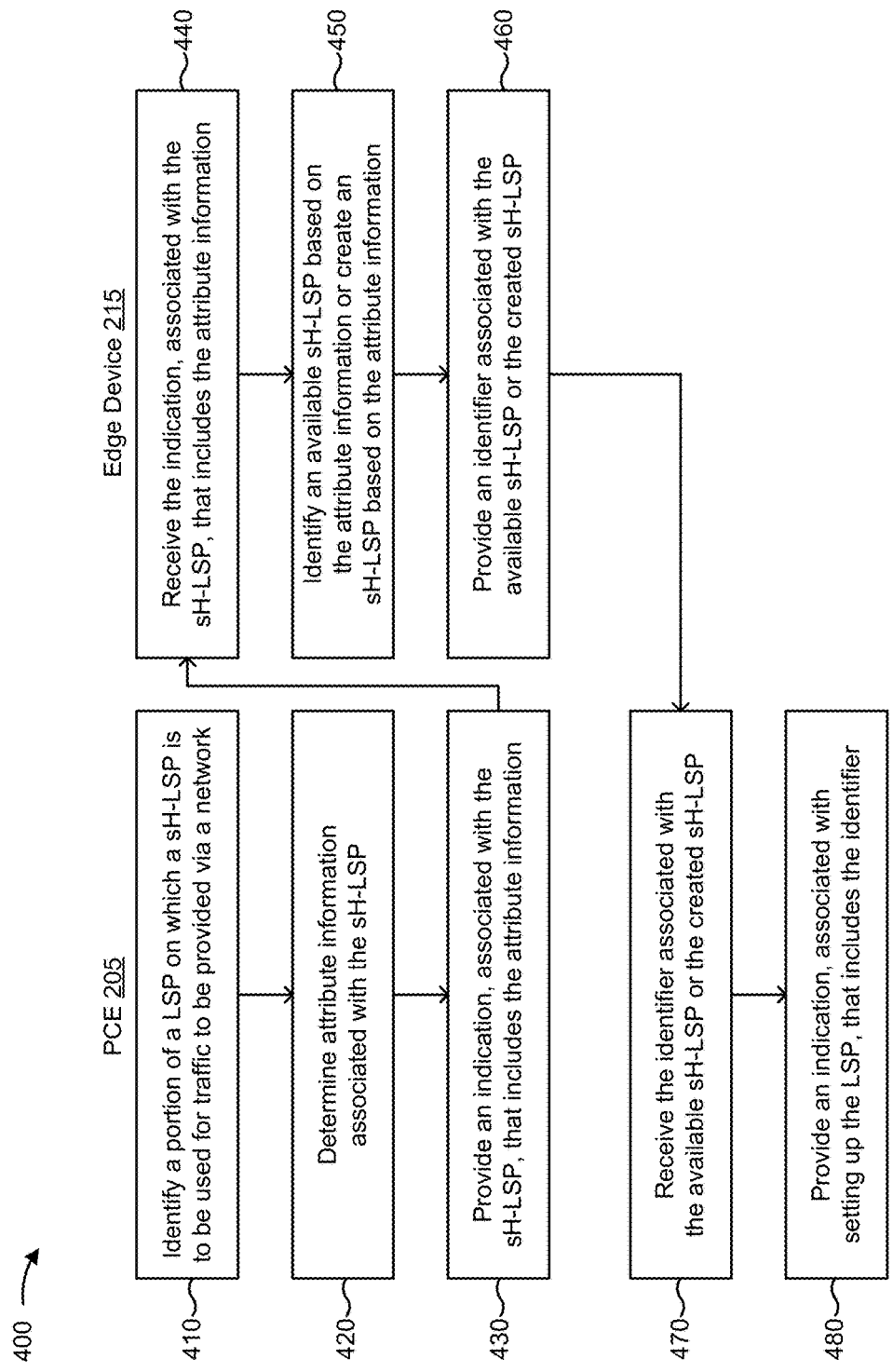
FIG. 4 is a flow chart of an example process for providing an indication, associated with setting up a LSP, that includes an identifier associated with a simple hierarchical LSP.

FIG. 4 is a flow chart of an example process 400 for providing an indication, associated with setting up a LSP, that includes an identifier associated with a sH-LSP. In some implementations, one or more process blocks of FIG. 4 may be performed by PCE 205 and/or edge device 215. In some implementations, one or more process blocks of FIG. 4 may be performed by another device or a group of devices separate from or including PCE 205 and/or edge device 215, such as one or more network device 220.

As shown in FIG. 4, process 400 may include identifying a portion of a LSP on which a simple hierarchical LSP is to be used for traffic to be provided via a network (block 410). For example, PCE 205 may identify a portion of a LSP on which a sH-LSP is to be used for traffic to be provided via network 210. In some implementations, PCE 205 may identify the portion of the LSP when PCE 205 receives information indicating that the traffic is to be provided via network 210.

The sH-LSP may include an H-LSP that is automatically (e.g., without user intervention) and/or dynamically created or identified based on an instruction and/or attribute information provided by PCE 205 (and/or edge device 215 with intelligence similar to PCE 205). As such, in some implementations, the sH-LSP may be an H-LSP for which creation, configuration, management, maintenance, or the like, requires fewer network resources, processing resources, memory resources, and/or less user configuration than a traditional H-LSP. For example, since the sH-LSP may be automatically and/or dynamically created based on the instruction and the attribute information, an edge device associated with the sH-LSP need not have intelligence to determine whether to create the sH-LSP, may not need to store state information associated with the sH-LSP, and/or may not need to advertise a link associated with the sH-LSP.

The LSP may include a network path through one or more networks 210 (e.g., one or more MPLS networks), including one or more edge devices 215 and one or more network devices 220, via which the traffic is to travel based on label switching. In some implementations, PCE 205 may be configured to cause traffic to traverse the one or more networks 210 (e.g., via edge devices 215 and network devices 220) using an LSP (e.g., an overlay LSP including one or more sH-LSPs). In some implementations, the LSP may traverse multiple networks 210. In some implementations, PCE 205 may identify (e.g., based on a configuration of PCE 205, based on information associated with the one or more edge devices 215 and/or one or more network devices 220, based on information associated with network 210, etc.) one or more portions of the LSP on which sH-LSPs are to be used, as described below.

In some implementations, PCE 205 may identify the portion of the LSP on which the sH-LSP is to be used based on analyzing information associated with network 210. For example, PCE 205 may be configured to perform (e.g., in order to improve performance of network 210) traffic engineering for network 210 by, for example, analyzing, predicting and/or regulating behavior of traffic travelling via network 210. Here, as a result of performing traffic engineering, PCE 205 may identify the portion of the LSP on which the sH-LSP is to be used. In some implementations, the portion of the LSP may correspond to a particular network 210 (e.g., such that each portion of the LSP is associated with a different network 210).

Additionally, or alternatively, PCE 205 may identify the portion of the LSP based on information associated with network 210. For example, PCE 205 may be store or have access to network policy information indicating that PCE 205 is to minimize a total number LSPs in network 210. In this example, PCE 205 may identify the portion of the LSP based on the network policy information (e.g., such that the portion of the LSP that lies within network 210 uses a sH-LSP).

Additionally, or alternatively, PCE 205 may identify the portion of the LSP based on information associated with edge devices 215 and/or network devices 220 of network 210. For example, PCE 205 may store or have access to device policy information indicating that PCE 205 is to minimize an amount of memory used by one or more edge devices 215 and/or one or more network devices 220 to store state information associated with transferring traffic. In this example, PCE 205 may identify the portion of the LSP based on the device policy information (e.g., such that the portion of the LSP that includes the one or more edge devices 215 and/or the one or more network devices 220 uses a sH-LSP).

Additionally, or alternatively, PCE 205 may identify the portion of the LSP based on receiving user input indicating that the portion of the LSP is to use the sH-LSP.

In some implementations, PCE 205 may identify one or more portions of the LSP on which sH-LSPs are to be used. For example, assume that a LSP includes a first portion associated with a first network 210, a second portion associated with a second network 210, and a third portion associated with a third network 210. Here, in this example, PCE 205 may identify (e.g., based on performing traffic engineering) that a first sH-LSP is to be used on the first portion of the LSP, that a sH-LSP is not to be used on the second portion of the LSP, and that a second sH-LSP is to be used on the third portion of the LSP.

As such, in some implementations, PCE 205 may identify one or more portions of the LSP on which sH-LSPs are not to be used. In such a case, PCE 205 may determine a manner in which the traffic is to traverse the one or more portions of the LSP on which sH-LSPs are not to be used, such as using a strict network hop, a loose network hop, or the like.

As further shown in FIG. 4, process 400 may include determining attribute information associated with the simple hierarchical LSP (block 420). For example, PCE 205 may determine attribute information associated with the sH-LSP. In some implementations, PCE 205 may determine the attribute information when (e.g., before, after, concurrently with, etc.) PCE 205 identifies the portion of the LSP on which the sH-LSP is to be used for the traffic.

The attribute information, associated with the sH-LSP, may include information that describes one or more configurations of the sH-LSP such that the sH-LSP may be capable of supporting the traffic. For example, the attribute information may include information associated with an attribute flag configuration, information associated with an automatic bandwidth configuration, information associated with a sH-LSP bandwidth configuration, information associated with a re-optimization configuration, information associated with a priority configuration, information associated with a failure protection configuration, information associated with a route recording configuration, or the like.

In some implementations, PCE 205 may determine e attribute information based on identifying the portion of the LSP on which the sH-LSP is to be used. For example, as described above, PCE 205 may perform traffic engineering to identify the portion of the LSP on which the sH-LSP is to be used. Here, the result of the traffic engineering may also identify one or more configurations of the sH-LSP that are needed to support transfer of the traffic via the sH-LSP.

In some implementations, PCE 205 may deter attribute information that includes one or more configurations of the sH-LSP. Additionally, or alternatively, PCE 205 may determine attribute information that includes a sH-LSP profile. For example, PCE 205 may store or have access to a set of sH-LSP profiles, where each sH-LSP profile is associated with a different set of sH-LSP configurations. Here, PCE 205 may determine the attribute information in the manner described above, and may identify a particular sH-LSP profile, of the set of sH-LSP profiles, that includes attribute information that matches (e.g., meets, exceeds, matches within a configuration threshold, etc.) the attribute information determined by PCE 205. In some implementations, information associated with the set of sH-LSP profiles may be stored or accessible by PCE 205.

In some implementations, PCE 205 may determine attribute information for multiple sH-LSPs. For example, if PCE 205 determines that a first sH-LSP is to be used on a first portion of the LSP, and that a second sH-LSP is to be used on a second (e.g., different) portion of the LSP, then PCE 205 may determine first attribute information for the first sH-LSP and second attribute information for the second sH-LSP.

As further shown in FIG. 4, process 400 may include providing an indication, associated with the sH-LSP, that includes the attribute information (block 430). For example, PCE 205 may provide an indication, associated with the sH-LSP, that includes the attribute information. In some implementations, PCE 205 may provide the indication including the attribute information after PCE 205 determines the attribute information associated with the sH-LSP.

The indication may include an indication to identify an available sH-LSP based on the attribute information, or create a sH-LSP based on the attribute information (e.g., when no available sH-LSP is identified). In some implementations, PCE 205 may provide the indication in an object associated with a path computation protocol such as an explicit route object (ERO) associated with a PCE Communication Protocol (PCEP), or another type of protocol associated with providing a path computation function. In such a case, PCE 205 may provide the indication in an attribute flag type-length-value (TLV) carried in a sub-object of the ERO, such as an ERO_HOP_ATTRIBUTES sub-object.

In some implementations, PCE 205 may provide the indication to edge device 215 associated with the sH-LSP. For example, assume that PCE 205 determines that a first sH-LSP is to be used on a first portion of the LSP, determines first attribute information associated with the first sH-LSP, determines that a second sH-LSP is to be used on a second portion of the LSP, and determines second attribute information associated with the second sH-LSP. Here, PCE 205 may provide, to an ingress edge device 215 of the first sH-LSP, a first object that includes the first attribute information. PCE 205 may similarly provide, to an ingress edge device 215 of the second sH-LSP, a second object that includes the second attribute formation.

In some implementations, the indication may include information that identifies the portion of the LSP on which the sH-LSP is to be used. For example, the indication may include information (e.g., a network address, a device name, a device identifier, etc.) that identifies edge device 215 at which the sH-LSP is to start (e.g., an ingress edge device 215), edge device 215 at which the sH-LSP is to end (e.g., an egress edge device 215), network 210 associated with the sH-LSP, or the like.

In some implementations, PCE 205 may also provide the attribute information in the object. For example, PCE 205 may provide the attribute information by including information that identifies the sH-LSP profile (e.g., a profile name, a profile identifier, etc.) in a hop-attribute TLV of the ERO (e.g., a SYMBOLIC-PROFILE-NAME hop-attribute TLV). As another example, PCE 205 may provide the attribute information by including information that identifies one or more configurations of the sH-LSP in the ERO (e.g., such that each of the one or more configurations is signaled separately within the ERO).

As further shown in FIG. 4, process 400 may include receiving the indication, associated with the sH-LSP, that includes the attribute information (block 440). For example, edge device 215 may receive the indication, associated with the sH-LSP, that includes the attribute information. In some implementations, edge device 215 may receive the indication when PCE 205 provides the indication.

In some implementations, the indication may include the object associated with the path computation protocol. For example, the indication may include the ERO associated with PCEP, where the ERO may include the attribute information associated with the sH-LSP.

As further shown in FIG. 4, process 400 may include identifying an available sH-LSP based on the attribute information or creating a sH-LSP based on the attribute information (block 450). For example, edge device 215 may identify an available sH-LSP based on the attribute information or create a sH-LSP based on the attribute information. In some implementations, edge device 215 may identify an available sH-LSP or create a sH-LSP when edge device 215 receives the indication, associated with the sH-LSP, that includes that attribute information.

In some implementations, edge device 215 may identify an available sH-LSP based when an existing sH-LSP (e.g., already supported by edge device 215) is available to support traffic such that a new sH-LSP need not be created. In other words, edge device 215 may determine whether a sH-LSP exists such that edge device 215 does not need to create an additional sH-LSP.

In some implementations, edge device 215 may identify an available sH-LSP based on information associated with an existing sH-LSP. For example, edge device 215 may store or have access to information associated with one or more existing sH-LSPs supported by edge device 215. Here, edge device 215 may determine that an existing sH-LSP is available based on, for example, determining whether an end of the existing sH-LSP matches an end of the sH-LSP associated with the indication (e.g., a same edge device 215, a same network address, etc.). Alternatively, edge device 215 may determine that no existing sH-LSP is available when the end of the sH-LSP, associated with the indication, is not shared with any existing sH-LSP. Similarly, edge device 215 may determine that no existing sH-LSP is available when no sH-LSPs are being supported by edge device 215.

Additionally, or alternatively, edge device 215 may determine whether an existing sH-LSP is available based on one or more configurations of the existing sH-LSP. For example, edge device 215 may determine whether configurations of the existing sH-LSP match (e.g., meet, exceed, match within a threshold, etc.) configurations included in the attribute information provided by PCE 205. As an example, edge device 215 may determine whether a sH-LSP bandwidth configuration of the existing sH-LSP matches a sH-LSP bandwidth configuration included in the attribute information, and may determine whether the sH-LSP is available, accordingly. As another example, edge device 215 may determine whether a profile associated with the existing sH-LSP matches a profile identified in the attribute information.

Additionally, or alternatively, edge device 215 may determine whether a sH-LSP is available based on usage information associated with the existing sH-LSP. For example, edge device 215 may determine a number of other LSPs that are using the existing sH-LSP and may determine whether the existing sH-LSP is available based on whether the number of other LSPs that are using the existing sH-LSP satisfies a usage threshold. As another example, edge device 215 may determine an amount of unused bandwidth associated with the existing sH-LSP, and may determine whether existing sH-LSP is available based on whether the amount of unused bandwidth satisfies a threshold and/or is sufficient to support the traffic.

In some implementations, when the end of the existing sH-LSP matches the end of the sH-LSP associated with the indication, when the configurations of the existing sH-LSP match the attribute information, and when the usage information of the existing sH-LSP indicates that the existing sH-LSP can support the traffic, then edge device 215 may identify the existing sH-LSP as an available sH-LSP (e.g., such that edge device 215 does not need to create a sH-LSP).

Alternatively, when the end of the existing sH-LSP does not match the end of the sH-LSP associated with the indication, when the configurations of the existing sH-LSP do not match the attribute information, when the usage information of the existing sH-LSP indicates that the existing sH-LSP cannot support the traffic, or when edge device 215 does not currently support any sH-LSPs, then edge device 215 may not identify the existing sH-LSP as an available sH-LSP. In some implementations, edge device 215 may determine that no existing sH-LSP, supported by edge device 215, is available.

In some implementations, when edge device 215 does not identify an available sH-LSP, edge device 215 may create the sH-LSP based on the attribute information. For example, edge device 215 may create the sH-LSP based on the one or more configurations included in the attribute information. As another example, edge device 215 may create the sH-LSP based on a profile identified in the attribute information. (e.g., when edge device 215 stores or has access to configurations corresponding to the profile).

In some implementations, the sH-LSP, created by edge device 215, may be used within another LSP (e.g., a LSP created at a later time). For example, the created sH-LSP may be seen as an existing sH-LSP during set up of another LSP at a later time, and edge device 215 may determine whether the created sH-LSP is available for use on a portion of the other LSP in the manner described above.

As further shown in FIG. 4, process 400 may include providing an identifier associated with the available sH-LSP or the created sH-LSP (block 460). For example, edge device 215 may provide an identifier associated with the available sH-LSP or the created sH-LSP. In some implementations, edge device 215 may provide the identifier, associated with the available sH-LSP, when edge device 215 identifies the available sH-LSP. Additionally, or alternatively, edge device 215 may provide the identifier, associated with the created sH-LSP, when edge device 215 creates the sH-LSP.

In some implementations, the identifier may include information that identifies the available sH-LSP or the created sH-LSP, such as a TE-link identifier. In some implementations, edge device 215 may provide the identifier to PCE 205. For example, edge device 215 may be configured to automatically provide the identifier, associated with the available sH-LSP, after edge device 215 identifies the available sH-LSP. As another example, edge device 215 may be configured to automatically provide the identifier, associated with the created sH-LSP, after edge device 215 creation of the sH-LSP is complete. In some implementations, the identifier associated with the sH-LSP may be kept private such that only PCE 205 and/or network device 220 that created the sH-LSP store or have access to the identifier. Here, PCE 205 and/or network device 220 may monitor and/or manage usage of the sH-LSP in order to prevent overuse and/or traffic congestion of the sH-LSP.

In some implementations, multiple edge devices 215 may provide corresponding multiple identifiers. For example, a first edge device 215, associated with a first sH-LSP corresponding to a first portion of the LSP, may provide a first identifier associated with a sH-LSP created by the first edge device 215 (e.g., based on a first indication provided by PCE 205). Here, a second edge device 215, associated with a second sH-LSP corresponding to a second portion of the LSP, may provide a second identifier associated with a sH-LSP identified as available (e.g., based on a second indication provided by PCE 205). In some implementations, PCE 205 may set up the LSP based on the multiple identifiers, as described below.

As further shown in FIG. 4, process 400 may include receiving the identifier associated with the available sH-LSP or the created sH-LSP (block 470). For example, PCE 205 may receive the identifier associated with the available sH-LSP or the created sH-LSP. In some implementations, PCE 205 may receive the identifier when edge device 215 provides the identifier. In some implementations, PCE 205 may receive multiple identifiers corresponding to multiple sH-LSPs to be included in the LSP.

As further shown in FIG. 4, process 400 may include providing an indication, associated with setting up the LSP, that includes the identifier (block 480). For example, PCE 205 may provide an indication, associated with setting up the LSP, that includes the identifier. In some implementations, PCE 205 may provide the indication after PCE 205 receives the identifier. Additionally, or alternatively, PCE 205 may provide the indication when PCE receives information indicating that PCE is to provide the indication associated with setting up the LSP.

In some implementations, the indication may include an object associated with setting up the LSP for transfer of the traffic, such as an ERO associated with a Resource Reservation Protocol (RSVP), or another protocol associated with setting up an LSP. For example, the indication may include an RSVP ERO, associated with setting up an LSP, that includes a TE-link identifier associated with the sH-LSP.

In some implementations, PCE 205 may provide the indication in order to cause the LSP to be set up based on the identifier. For example, assume that PCE 205 receives a first identifier corresponding to a first sH-LSP to be included in the LSP, and a second identifier corresponding to a second sH-LSP to be included in the LSP. Here, PCE 205 may provide the indication to a first edge device 215 associated with the first sH-LSP. The first edge device 215 may, using the first identifier, set up a first portion of the LSP such that the LSP includes the first sH-LSP. The first edge device 215 may provide (e.g., forward) the indication to a second edge device 215 associated with the second sH-LSP. The second edge device 215 may, using the second identifier, set up a second portion of the LSP such that the LSP includes the second sH-LSP.

In this way, PCE 205 may cause a LSP to be set up based on one or more identifiers associated with one or more sH-LSPs to be included in the LSP. Notably, as described with respect to process 400, PCE 205 may cause the one or more sH-LSPs to be identified as available and/or created before PCE 205 initiates set up of the LSP. However, in some implementations, PCE 205 may cause the one or more sH-LSPs to be identified as available and/or created concurrently with causing the LSP to be set up, as described below with respect to process 500.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
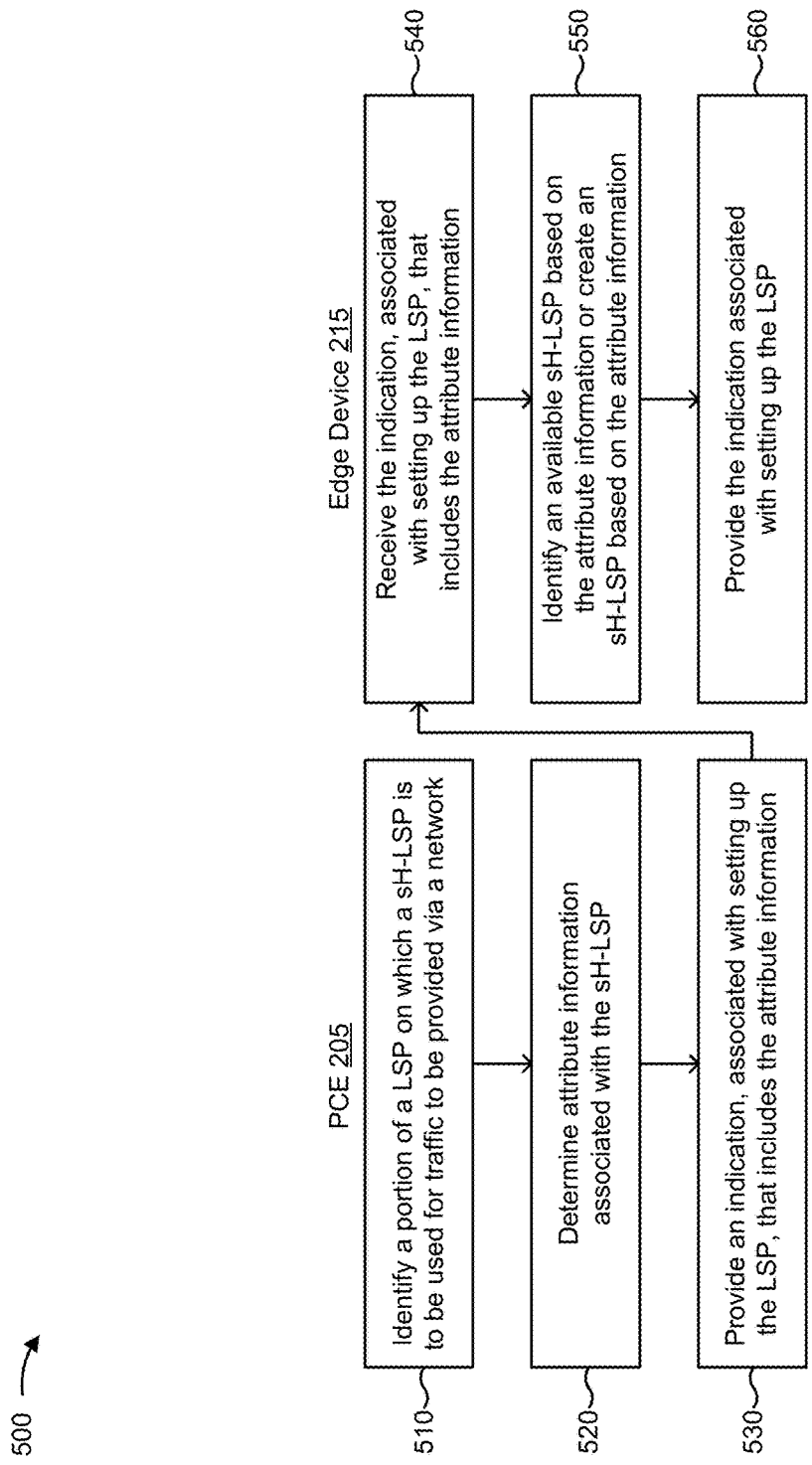
FIG. 5 is a flow chart of an example process for providing an indication, associated with setting up a LSP, that includes attribute information associated with a simple hierarchical LSP.

FIG. 5 is a flow chart of an example process 500 for providing an indication, associated with setting up a LSP, that includes attribute information associated with a sH-LSP. In some implementations, one or more process blocks of FIG. 5 may be performed by PCE 205 and/or edge device 215. In some implementations, one or more process blocks of FIG. 5 may be performed by another device or a group of devices separate from or including PCE 205 and/or edge device 215, such as one or more network device 220.

As shown in FIG. 5, process 500 may include identifying a portion of a LSP on which a simple hierarchical LSP is to be used for traffic to be provided via a network (block 510). For example, PCE 205 may identify a portion of a LSP on which a sH-LSP is to be used for traffic to be provided via network 210, in a manner similar to that described above with regard to FIG. 4

As further shown in FIG. 5, process 500 may include determining attribute information associated with the simple hierarchical LSP (block 520). For example, PCE 205 may determine attribute information associated with the sH-LSP, in a manner similar to that described above with regard to FIG. 4.

As further shown in FIG. 5, process 500 may include providing an indication, associated with setting up the LSP, that includes the attribute information (block 530). For example, PCE 205 may provide an indication, associated with setting up the LSP, that includes the attribute information. In some implementations, PCE 205 may provide the indication after PCE 205 determines the attribute information. Additionally, or alternatively, PCE 205 may provide the indication when PCE receives information indicating that PCE is to provide the indication associated with setting up the LSP.

In some implementations, the indication may include an object associated with setting up the LSP for transfer of the traffic based on identifying an available sH-LSP using the attribute information or creating a sH-LSP using the attribute information. For example, the indication may include an RSVP ERO, associated with setting up the LSP, that includes the attribute information associated with the sH-LSP. In such a case, PCE 205 may provide the indication in an attribute TLV carried in a sub-object of the ERO, such as an ERO-_HOP_ATTRIBUTES sub-object. The indication, associated with setting up the LSP, may include the attribute information associated with the sH-LSP (e.g., rather than an identifier associated with the sH-LSP, as described with regard to example process 400, since PCE 205 may not have knowledge of the identifier and/or the sH-LSP may not yet exist).

In some implementations, PCE 205 may provide the indication to a first edge device 215 associated with the LSP (e.g., a head-end node of the LSP). In some implementations, PCE 205 may provide the indication in order to cause the LSP to be set up based on identifying available sH-LSPs or creating sH-LSPs using the attribute information, as described in further detail below.

As further shown in FIG. 5, process 500 may include receiving the indication, associated with setting up the LSP, that includes the attribute information (block 540). For example, edge device 215 (e.g., the head-end node of the LSP) may receive the indication, associated with setting up the LSP, that includes the attribute information. In some implementations, edge device 215 may receive the indication when PCE 205 provides the indication.

As further shown in FIG. 5, process 500 may include identifying an available sH-LSP based on the attribute information or creating a sH-LSP based on the attribute information (block 550). For example, edge device 215 may identify an available sH-LSP based on the attribute information or create a sH-LSP based on the attribute information, in a manner similar to that described above with regard to FIG. 4.

In some implementations, edge device 215 may determine whether a sH-LSP is available after determining whether a sH-LSP is to be used on a portion of the LSP associated with edge device 215. For example, assume PCE 205 provides an indication that a sH-LSP is to be used on a second portion of the LSP (e.g., a second portion starting at a second edge device 215 and at an end of a first portion of the LSP), but not on the first portion of the LSP (e.g., starting at a first edge device 215). Here, when the first edge device 215 receives the object, the first edge device 215 may determine that a sH-LSP is not to be used on the first portion of the LSP and (e.g., after setting up the portion of the LSP in some other manner, such as using a strict hop, a loose hop, etc.) may provide the object to the second edge device 215. The second edge device 215 may then determine, based on the indication, that a sH-LSP is to be used on the second portion of the LSP, and may proceed with determining whether a sH-LSP is available for use on the portion of the LSP.

In some implementations, based on identifying the available sH-LSP or creating the sH-LSP, edge device 215 may set up the LSP such that the LSP includes the available sH-LSP or the created sH-LSP. In other words, the LSP may be set up concurrently with the identification of the available sH-LSP or the creation of the sH-LSP (e.g., rather than providing an identifier associated with the sH-LSP such that the sH-LSP may be set up at a later time, as described in connection with process 400).

For example, assume that PCE 205 determines attribute information for a first sH-LSP to be included in the LSP, and attribute information for a second sH-LSP to be included in the sH-LSP. Here, PCE 205 may provide the indication (e.g., including the first and second attribute information) to a first edge device 215 associated with the first sH-LSP. The first edge device 215 may, using the first attribute information, identify a first available sH-LSP or create a first sH-LSP, and may then set up a first portion of the LSP such that the LSP includes the first available sH-LSP or the first created sH-LSP. The first edge device 215 may then provide (e.g., forward) the indication to a second edge device 215 associated with the second sH-LSP, as described below. The second edge device 215 may, using the second attribute information, identify a second available sH-LSP or create a second sH-LSP, and may then set up a second portion of the LSP such that the LSP includes the second available sH-LSP or the second created sH-LSP. This process may be repeated until the entire LSP is set up (e.g., including multiple sH-LSPs).

As further shown in FIG. 5, process 500 may include providing the indication, associated with setting up the LSP (block 560). For example, edge device 215 may provide the indication associated with setting up the LSP. In some implementations, edge device 215 may provide the indication after edge device 215 identifies the available sH-LSP or creates the sH-LSP. Additionally, or alternatively, edge device 215 may provide the indication when edge device 215 sets up a portion of the LSP associated with the available sH-LSP or the created sH-LSP.

In some implementations, edge device 215 may forward the indication, provided by PCE 205, to another edge device 215 such that the other edge device 215 may identify an available sH-LSP or create an LSP, and set up another portion of the LSP, as described in the above example.

Notably, as described with respect to process 500, PCE 205 may cause the one or more sH-LSPs to be identified as available and/or created during setup of the LSP (e.g., rather than before setup of the LSP, as described with regard to process 400).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may provide for a simple H-LSP (sH-LSP) for which management is simplified such that an amount of resources and/or an amount of user configuration is reduced (e.g., as compared to a traditional H-LSP). In some implementations, a sH-LSP differs from a traditional H-LSP in that a centralized entity, such as a PCE, may cause the sH-LSP to be created (while is not possible for a centralized entity to cause a traditional H-LSP to be created). For example, the PCE may indicate that the sH-LSP is to be used on a particular portion of a LSP associated with a network and, thus, may instruct another device to create the sH-LSP or identify of an existing sH-LSP for use in the LSP. The sH-LSP also differs from the traditional H-LSP in that the sH-LSP may be kept private (i.e., not advertised) such that only the PCE and a head end node, associated with the sH-LSP, know of the existence of the sH-LSP (while existence of the traditional H-LSP may be advertised to other devices).

In some implementations, the PCE may cause the LSP to be set up after the PCE receives an identifier associated with the sH-LSP. In some implementations, after the sH-LSP is created, the sH-LSP identifier (e.g., a TE link identifier) may be kept private (i.e., may not advertised) such that only the PCE and/or a head end node of the sH-LSP store or have access to the sH-LSP identifier. This may prevent overuse and/or congestion of the sH-LSP since the PCE may monitor and/or manage use of the sH-LSP for various traffic flows. In some implementations, the PCE may cause the LSP to be set up based on providing attribute information associated with the sH-LSP (e.g., such that the sH-LSP is created or identified during setup of the LSP).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, an indication associated with setting up a label-switched path (LSP),
        the indication including first attribute information and second attribute information;
    selectively:
        identifying, by the device, a first available simple hierarchical LSP (sH-LSP) based on the first attribute information, or
        creating, by the device, a first sH-LSP based on the first attribute information;
    setting up, by the device, a first portion of the LSP to include the first available sH-LSP or the first created sH-LSP; and
    providing, by the device based on setting up the first portion of the LSP, the indication to another device to cause the other device, based on receiving the indication and using the second attribute information, to set up a second portion of the LSP to include a second available sH-LSP or a second created sH-LSP.

2. The method of claim 1, where the indication includes an object associated with a path computation protocol.

3. The method of claim 1, where identifying the first available sH-LSP comprises:
identifying an existing sH-LSP as the first available sH-LSP based on the existing sH-LSP being able to support traffic such that another sH-LSP is not needed.

4. The method of claim 1, where identifying the first available sH-LSP comprises:
identifying an existing sH-LSP as the first available sH-LSP based on information associated with the existing sH-LSP.

5. The method of claim 1, where identifying the first available sH-LSP comprises:
identifying an existing sH-LSP as the first available sH-LSP based on one or more configurations of the existing sH-LSP.

6. The method of claim 1, where identifying the first available sH-LSP comprises:
identifying an existing sH-LSP as the first available sH-LSP based on usage information associated with the existing sH-LSP.

7. The method of claim 1, where creating the first sH-LSP comprises:
creating the first sH-LSP based on not identifying an available sH-LSP.

8. A device, comprising:
a memory; and
one or more processors to:
receive an indication associated with setting up a label-switched path (LSP),
the indication including first attribute information and second attribute information;
selectively:
identify a first available simple hierarchical LSP (sH-LSP) based on the first attribute information, or
create a first sH-LSP based on the first attribute information;
set up a first portion of the LSP to include the first available sH-LSP or the first created sH-LSP; and
provide, based on setting up the first portion of the LSP, the indication to another device
to cause the other device, based on receiving the indication and using the second attribute information, to set up a second portion of the LSP to include a second available sH-LSP or a second created sH-LSP.

9. The device of claim 8, where the one or more processors, when creating the first sH-LSP, are to:
create the first sH-LSP based on one or more configurations included in the first attribute information.

10. The device of claim 8, where the one or more processors, when creating the first sH-LSP, are to:
create the first sH-LSP based on a profile identified in the first attribute information.

11. The device of claim 8, where the LSP is a first LSP; and
where the one or more processors are further to:
determine that the first created sH-LSP is available for use on a second LSP; and
provide an identifier of the first created sH-LSP to the other device.

12. The device of claim 8, where the one or more processors are further to:
provide an identifier associated with the first available sH-LSP or the first created sH-LSP.

13. The device of claim 12, where the identifier is provided to a Path Computation Element (PCE).

14. A non-transitory computer-readable medium storing instructions, the instructions comprising:
one or more instructions that, when executed by one or more processors of a device, cause the one or more processors to:
receive an indication associated with setting up a label-switched path (LSP),
the indication including first attribute information and second attribute information;
selectively:
identify a first available simple hierarchical LSP (sH-LSP) based on the first attribute information, or
create a first sH-LSP based on the first attribute information;
set up a first portion of the LSP to include the first available sH-LSP or the first created sH-LSP; and
provide, based on setting up the first portion of the LSP, the indication to another device
to cause the other device, based on receiving the indication and using the second attribute information, to set up a second portion of the LSP to include a second available sH-LSP or a second created sH-LSP.

15. The non-transitory computer-readable medium of claim 14, where the one or more instructions, when executed by the one or more processors, further cause the one or more processors to:
provide an identifier, associated with the first available sH-LSP, based on identifying the first available sH-LSP.

16. The non-transitory computer-readable medium of claim 14, where the one or more instructions, when executed by the one or more processors, further cause the one or more processors to:
provide an identifier, associated with the first created sH-LSP, based on creating the first sH-LSP.

17. The non-transitory computer-readable medium of claim 14, where the one or more instructions, when executed by the one or more processors, further cause the one or more processors to:
provide an identifier, associated with the first available sH-LSP or the first created sH-LSP, to the other device,
the identifier being kept private such that only the device and the other device have access to the identifier.

18. The non-transitory computer-readable medium of claim 14, where the first available sH-LSP or the first created sH-LSP is monitored or managed to prevent overuse or traffic congestion.

19. The non-transitory computer-readable medium of claim 14, where the device is a first edge device and the other device is a second edge device.

20. The device of claim 8, where the one or more processors, when identifying the first available sH-LSP, are to:

identify an existing sH-LSP as the first available sH-LSP based on a bandwidth configuration of the existing sH-LSP.

* * * * *